United States Patent
Hutton

(10) Patent No.: US 12,426,572 B2
(45) Date of Patent: Sep. 30, 2025

(54) TREAT DISPENSING DEVICE

(71) Applicant: Amanda E. Hutton, Lantana, FL (US)

(72) Inventor: Amanda E. Hutton, Lantana, FL (US)

(*) Notice: Subject to any disclaimer, the term of this patent is extended or adjusted under 35 U.S.C. 154(b) by 57 days.

(21) Appl. No.: 18/619,891

(22) Filed: Mar. 28, 2024

(65) Prior Publication Data
US 2024/0237612 A1 Jul. 18, 2024

Related U.S. Application Data

(63) Continuation-in-part of application No. 17/357,594, filed on Jun. 24, 2021, now abandoned.

(60) Provisional application No. 63/046,341, filed on Jun. 30, 2020.

(51) Int. Cl.
*A01K 5/02* (2006.01)

(52) U.S. Cl.
CPC ...................... *A01K 5/02* (2013.01)

(58) Field of Classification Search
CPC ........................................... A01K 5/02
USPC ........................................ 119/51.01
See application file for complete search history.

(56) References Cited

U.S. PATENT DOCUMENTS 2,937,475 A * 5/1960 Crawford ............... A63H 33/00
446/409

FOREIGN PATENT DOCUMENTS

CN 108849592 A * 11/2018 ............... A01K 5/02

OTHER PUBLICATIONS

MACHINE_TRANSLATION_CN-108849592-A (Year: 2018).*
YouTube_SPOT.pdf._ https://www.youtube.com/watch?v=ONBv26Y6A68 (Year: 2018).*

* cited by examiner

*Primary Examiner* — Morgan T Jordan
*Assistant Examiner* — Sahar Almatrahi
(74) *Attorney, Agent, or Firm* — KALI LAW GROUP, P.C.

(57) ABSTRACT

Treat dispensing devices are presented including: including: a base, where the base includes a bowl portion and a central recessed portion, where the central recessed portion is positioned under the bowl portion; a dome-shaped covering removably coupled along a top edge of the bowl portion, where the dome-shaped covering includes a dome surface having at least one opening along the dome surface; a pair of drive wheels connected by a crankshaft; a dispensing mechanism actuated by rotation of the crankshaft, where the dispensing mechanism includes: a plunger having a plunger disk, a plunger rod, and a plunger stop, where the plunger disk is slidingly engaged along the central recessed portion; a compression spring positioned below the plunger disk and contained within the central recessed portion; and a pivoting escapement actuated by the crankshaft rotating in a forward or a backward rotation of the crankshaft.

7 Claims, 8 Drawing Sheets

TREAT DISPENSING DEVICE

BACKGROUND

Currently, there are several solutions for pet treat dispensers. Some of these solutions are hide and seek puzzles, weighted rockers, and handheld launchers. Hide and seek puzzles and weighted rockers attempt to create thoughtful and slow feeding, but these solutions fail to meet the needs of the industry because not enough exertion is required by the pets and pets need exercise. Other solutions, such as handheld launchers, attempt to slow feeding, but these solutions are similarly unable to meet the needs of the industry because they require the pet parent to activate them, making the pet dependent upon the parent.

As such, treat dispensing devices are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, treat dispensing devices are presented including: a base, where the base includes a bowl portion and a central recessed portion, where the central recessed portion is positioned under the bowl portion; a dome-shaped covering removably coupled along a top edge of the bowl portion, where the dome-shaped covering includes a dome surface having at least one opening along the dome surface; a pair of drive wheels connected by a crankshaft; a dispensing mechanism actuated by rotation of the crankshaft, where the dispensing mechanism includes: a plunger having a plunger disk, a plunger rod, and a plunger stop, where the plunger disk is slidingly engaged along the central recessed portion; a compression spring positioned below the plunger disk and contained within the central recessed portion; and a pivoting escapement actuated by the crankshaft rotating in a forward or a backward rotation of the crankshaft, where the pivoting escapement is pivotally coupled with the plunger rod by the plunger stop, where the plunger stop directly engages with a pad recessed along a bottom surface of the central recessed portion to limit upward vertical movement of the plunger, and where the pivoting escapement resets by directly engaging with the bottom surface of the central recessed portion; and a pair of stabilizing wheels. In some embodiments, treat dispensing devices include: a vented cover positioned centrally along a bottom surface of the treat dispensing device to cover the dispensing mechanism. In some embodiments, treat dispensing devices further include a reducing insert removably inserted into the at least one opening to reduce the at least one opening in size and a closing insert removably inserted into the at least one opening to close the at least one opening.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

It may be desirable to have a treat dispensing device that will slow down pet feeding time, especially dogs that tend to eat very quickly. Treat dispensing device embodiments presented typically allows only 1-3 treats to dispense at a time. In this manner, pets earn their food or treat reward over time. Furthermore, it is also fun for the pet owner to watch their pet move the treat dispensing device around, to hear the treat dispensing device being activated (a "popping" sound), to see the treats pop out, and to watch their pet chase down the food or treat. The disclosed treat dispensing device embodiments advantageously fill these pet feeding needs by providing a treat dispensing device that is not only fun to watch but provides exercise for the pet and helps pet's digestion. Therefore, there currently exists a need in the industry for a durable, stable, fun, and slow feeding treat dispensing device.

Treat dispensing device embodiments disclosed are unique because they: 1) allow pets to feed/treat themselves; 2) act as a slow feeder, which aids in digestion; 3) provide an exercise tool; and 4) provide visual and aural "popping" action.

Figure 1:
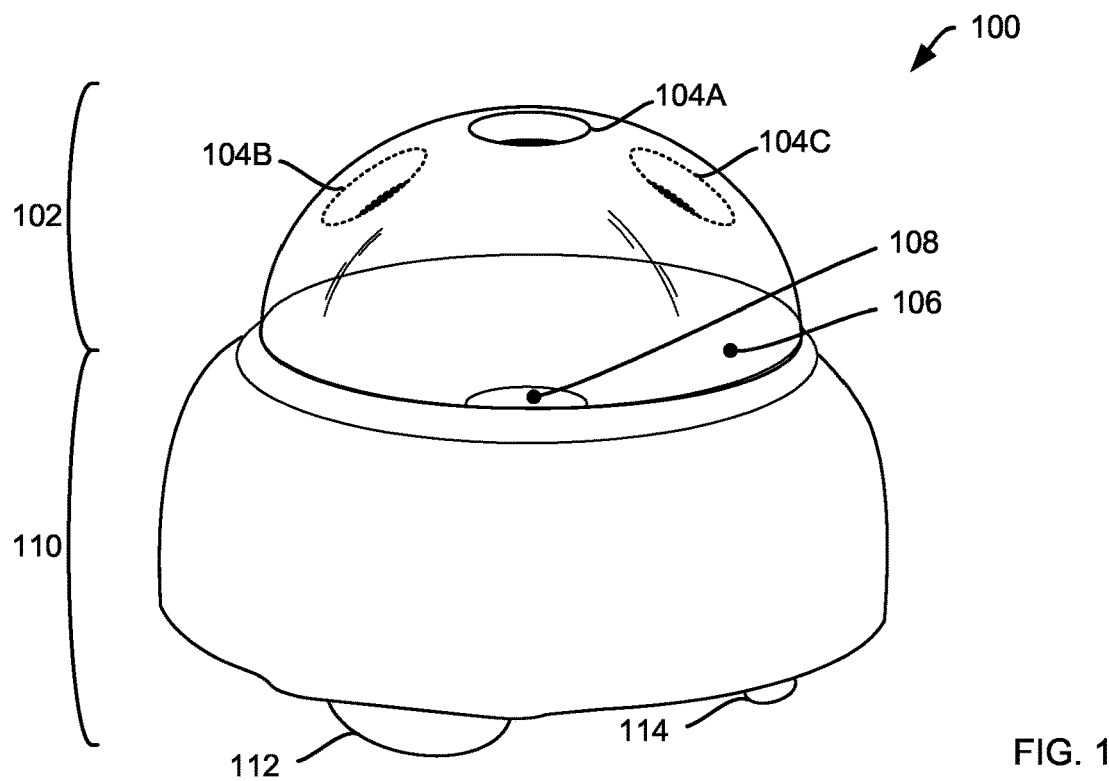
FIG. 1 is an illustrative orthogonal side view of a treat dispensing device in accordance with embodiments of the present invention.

FIG. 1 is an illustrative orthogonal side view of treat dispensing device 100 in accordance with embodiments of the present invention. As illustrated treat dispensing device 100 includes dome-shaped covering 102 and base 110. In some embodiments, the dome-shaped covering is removably coupled with the base in any manner known in the art. In other embodiments, the dome-shaped covering is permanently affixed with the base. In embodiments, the dome-shaped covering may be transparent, semi-transparent, or opaque as desired. As illustrated, openings 104A-104C are located along the surface of dome-shaped covering 102. In embodiments, one or more openings may be provided. Different openings are utilized to direct treats dispensed by the device. For example, a top opening may dispense treats all around the device while a front opening may dispense treats in a forward direction. Any number and combination of openings may be utilized without departing from embodiments provided herein. In addition, the sizing of the opening may be adjusted to limit the size and/or quantity of treats dispensed. In some embodiments, an insert may be utilized to adjust the opening. Inserts will be discussed in further detail below for FIG. 11. Further illustrated, base 110 includes a bowl portion 106 having dispensing mechanism 108. Dispensing mechanism is actuated by rotation of a crankshaft coupled to drive wheels 112. Dispensing mechanisms will be discussed in further detail below for FIGS. 8 and 9. Further illustrated are stabilizing wheels 114 which serve to stabilize the device as well as provide a swiveling action in some embodiments. Stabilizing wheel embodiments will be discussed in further detail below for FIGS. 6 and 7.

Figure 2:
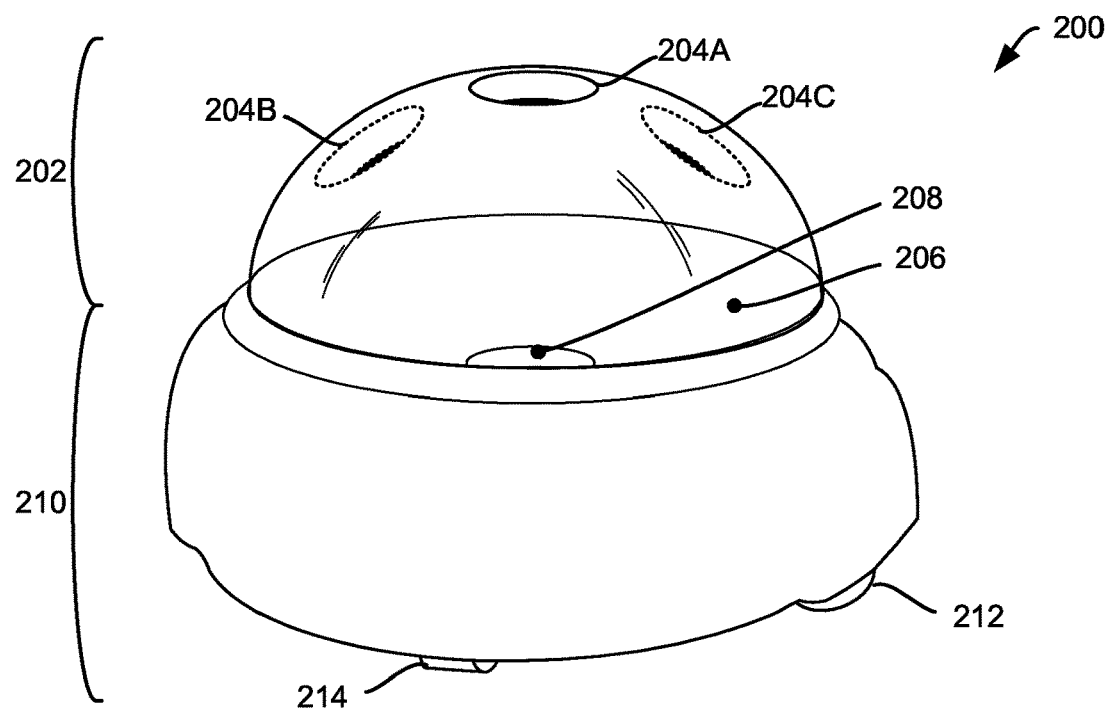
FIG. 2 is an illustrative orthogonal front view of a treat dispensing device in accordance with embodiments of the present invention.

FIG. 2 is an illustrative orthogonal front view of treat dispensing device 200 in accordance with embodiments of the present invention. As illustrated treat dispensing device 200 includes dome-shaped covering 202 and base 210. In embodiments, the dome-shaped covering is removably coupled with the base in any manner known in the art. In other embodiments, the dome-shaped covering is permanently affixed with the base. In embodiments, the dome-shaped covering may be transparent, semi-transparent, or opaque as desired. As illustrated, openings 204A-204C are located along the surface of dome-shaped covering 202. In embodiments, one or more openings may be provided. Different openings are utilized to direct treats dispensed by the device. For example, a top opening may dispense treats all around the device while a front opening may dispense treats in a forward direction. Any number and combination of openings may be utilized without departing from embodiments provided herein. In addition, the sizing of the opening may be adjusted to limit the size and/or quantity of treats dispensed. In some embodiments, an insert may be utilized to adjust the opening. Inserts will be discussed in further detail below for FIG. 11. Further illustrated, base 210 includes a bowl portion 206 having dispensing mechanism 208. Dispensing mechanism is actuated by rotation of a crankshaft coupled to drive wheels 212. Dispensing mechanisms will be discussed in further detail below for FIGS. 8 and 9. Further illustrated are stabilizing wheels 214 which serve to stabilize the device as well as provide a swiveling action in some embodiments. Stabilizing wheel embodiments will be discussed in further detail below for FIGS. 6 and 7.

Figure 3:
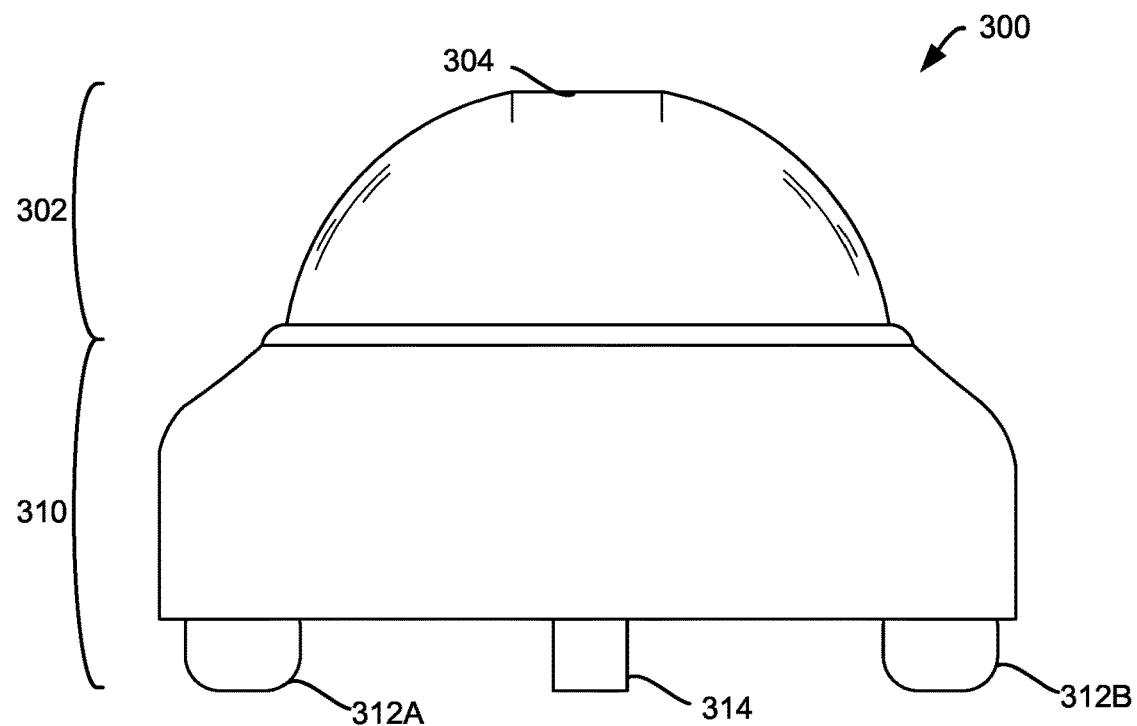
FIG. 3 is an illustrative front view of a treat dispensing device in accordance with embodiments of the present invention.

FIG. 3 is an illustrative front view of treat dispensing device 300 in accordance with embodiments of the present invention. As illustrated treat dispensing device 300 includes dome-shaped covering 302 and base 310. In embodiments, the dome-shaped covering is removably coupled with the base in any manner known in the art. In other embodiments, the dome-shaped covering is permanently affixed with the base. In the illustrated embodiment, opening 304 is located along the surface at the top of dome-shaped covering 302. In embodiments, one or more openings may be provided. Different openings are utilized to direct treats dispensed by the device. For example, a top opening as shown may dispense treats all around the device while a front opening not shown may dispense treats in a forward direction. Any number and combination of openings may be utilized without departing from embodiments provided herein. In addition, the sizing of the opening may be adjusted to limit the size and/or quantity of treats dispensed. In some embodiments, an insert may be utilized to adjust the opening. Inserts will be discussed in further detail below for FIG. 11. Further illustrated, base 310 includes drive wheels 312A and 312B for actuating a dispensing mechanism and stabilizing wheels 314 for stabilizing the device as well as provide a swiveling action in some embodiments. Stabilizing wheel embodiments will be discussed in further detail below for FIGS. 6 and 7.

Figure 4:
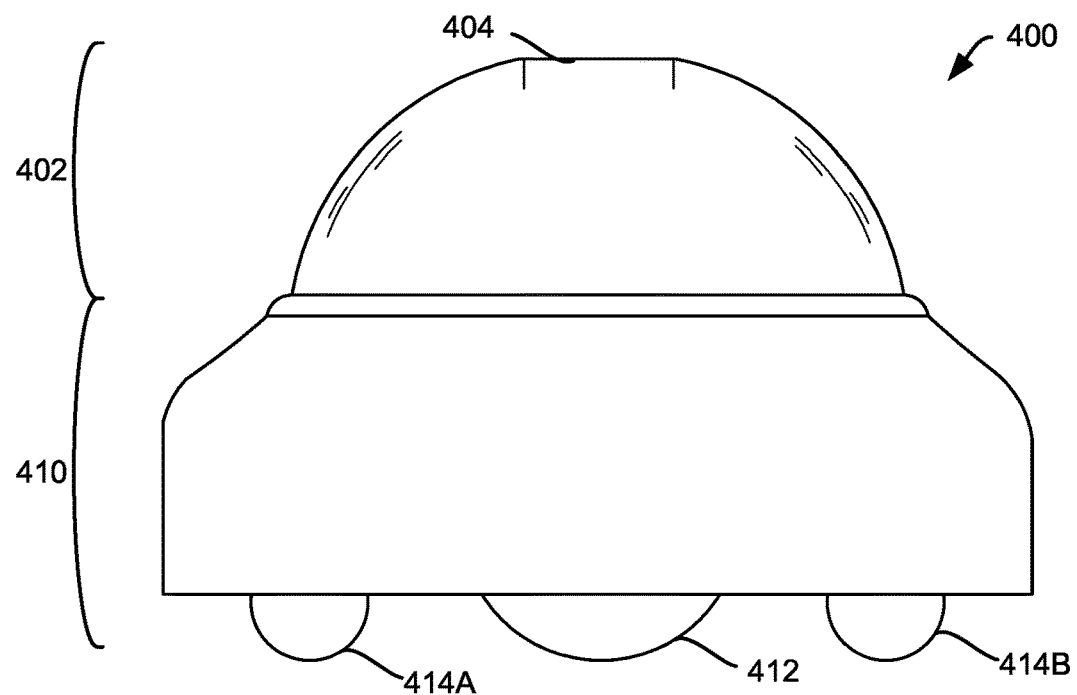
FIG. 4 is an illustrative side view of a treat dispensing device in accordance with embodiments of the present invention.

FIG. 4 is an illustrative front view of treat dispensing device 400 in accordance with embodiments of the present invention. As illustrated treat dispensing device 400 includes dome-shaped covering 402 and base 410. In embodiments, the dome-shaped covering is removably coupled with the base in any manner known in the art. In other embodiments, the dome-shaped covering is permanently affixed with the base. In the illustrated embodiment, opening 404 is located along the surface at the top of dome-shaped covering 402. In embodiments, one or more openings may be provided. Different openings are utilized to direct treats dispensed by the device. For example, a top opening as shown may dispense treats all around the device while a front opening not shown may dispense treats in a forward direction. Any number and combination of openings may be utilized without departing from embodiments provided herein. In addition, the sizing of the opening may be adjusted to limit the size and/or quantity of treats dispensed. In some embodiments, an insert may be utilized to adjust the opening. Inserts will be discussed in further detail below for FIG. 11. Further illustrated, base 410 includes drive wheels 412 for actuating a dispensing mechanism and stabilizing wheels 414A and 414B for stabilizing the device as well as provide a swiveling action in some embodiments. Stabilizing wheel embodiments will be discussed in further detail below for FIGS. 6 and 7.

Figure 5:
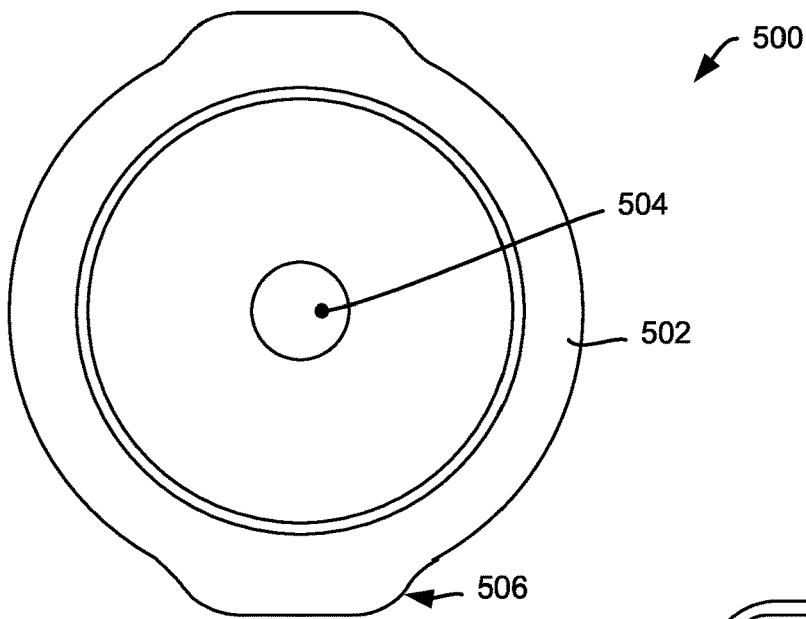
FIG. 5 is an illustrative top view of a treat dispensing device in accordance with embodiments of the present invention.

FIG. 5 is an illustrative top view of treat dispensing device 500 in accordance with embodiments of the present invention. As illustrated, treat dispensing device 500 includes base 502. Further illustrated is wheel flare 506. A wheel flare may be useful to cover the moving drive wheel so that unwanted items are not wrapped around the crankshaft. Still further illustrated is dispensing mechanism 504 that is actuated by rotation of a crankshaft coupled to drive wheels. Dispensing mechanisms will be discussed in further detail below for FIGS. 8 and 9.

Figure 6:
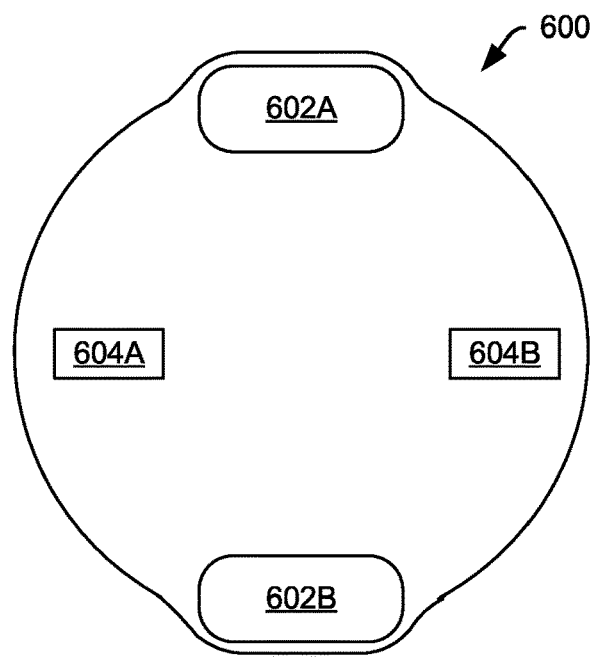
FIG. 6 is an illustrative bottom view of a treat dispensing device in accordance with embodiments of the present invention.

FIG. 6 is an illustrative bottom view of treat dispensing device 600 in accordance with embodiments of the present invention. As illustrated, treat dispensing device 600 includes drive wheels 602A and 602B. As noted above, drive wheels are utilized for actuating a dispensing mechanism. In the illustrated embodiment, stabilizing wheels 604A and 604B are utilized for stabilizing the device. In addition, the illustrated stabilizing wheels are each rotatably coupled to a fixed axle that serves to limit movement of the device to a forward and backward direction.

Figure 7:
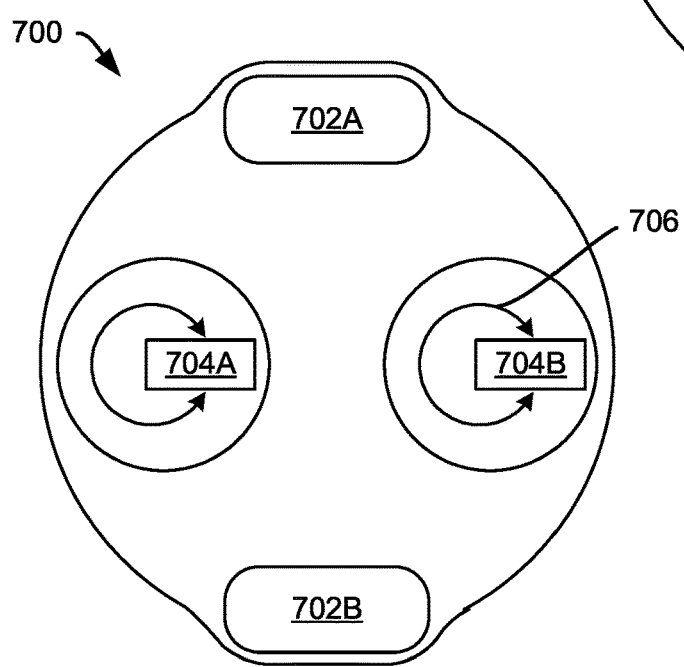
FIG. 7 is an illustrative bottom view of a treat dispensing device in accordance with embodiments of the present invention.

FIG. 7 is an illustrative bottom view of treat dispensing device 700 in accordance with embodiments of the present invention. As illustrated, treat dispensing device 700 includes drive wheels 702A and 702B. As noted above, drive wheels are utilized for actuating a dispensing mechanism. In the illustrated embodiment, stabilizing wheels 704A and 704B are swivel castors and are utilized for stabilizing the device. In addition, the illustrated stabilizing wheels each swivel as indicated by arrow 706 to allow the device to swivel and turn.

Figure 8:
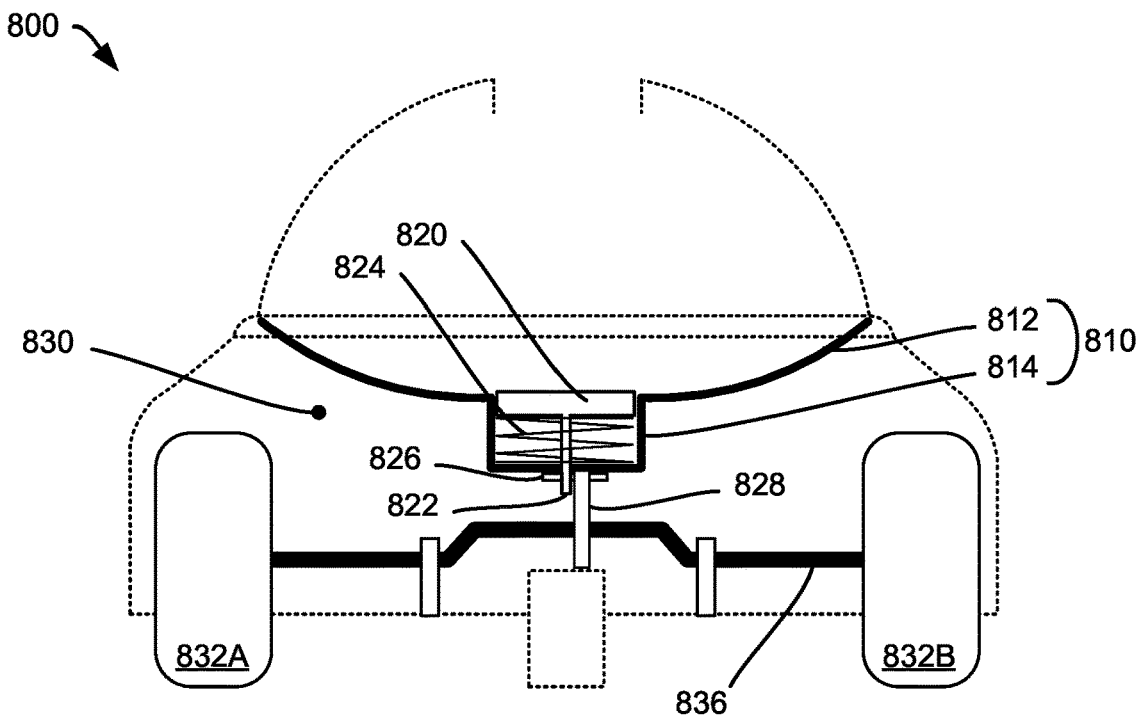
FIG. 8 is an illustrative front cut away view of a treat dispensing device in accordance with embodiments of the present invention.

FIG. 8 is an illustrative front cut away view of treat dispensing device 800 in accordance with embodiments of the present invention. In particular, FIG. 8 illustrates a dispensing mechanism embodiment housed within the base. As illustrated, treat dispensing device 800 includes bowl portion 810 which includes central recessed portion 814 and bottom surface 812 surrounding the central recessed portion and sloped toward the central recessed portion. In this manner, treats loaded into a treat dispensing device embodiment settle toward the dispensing mechanism. Treat dispensing device further includes compartment portion 830 positioned under bowl portion 810 for housing various elements of the device. As illustrated, the dispensing mechanism includes a plunger which includes plunger disk 820, plunger rod 822 and plunger stop 826. In embodiments, the plunger disk is slidingly engaged along the central recessed portion. Furthermore, in embodiments, the plunger disk is sized so that treats cannot be captured underneath the plunger disk or interfere with movement of the plunger disk along the central recessed portion. Further illustrated, dispensing mechanism further includes compression spring 824 positioned below plunger disk 820 and contained within central recessed portion 814. Further illustrated, dispensing mechanism includes pivoting escapement 828. In operation, pivoting escapement 828 is actuated by crankshaft 836 rotating in a forward or a backward rotation in response to movement of drive wheels 832A and 832B.

Figure 9:
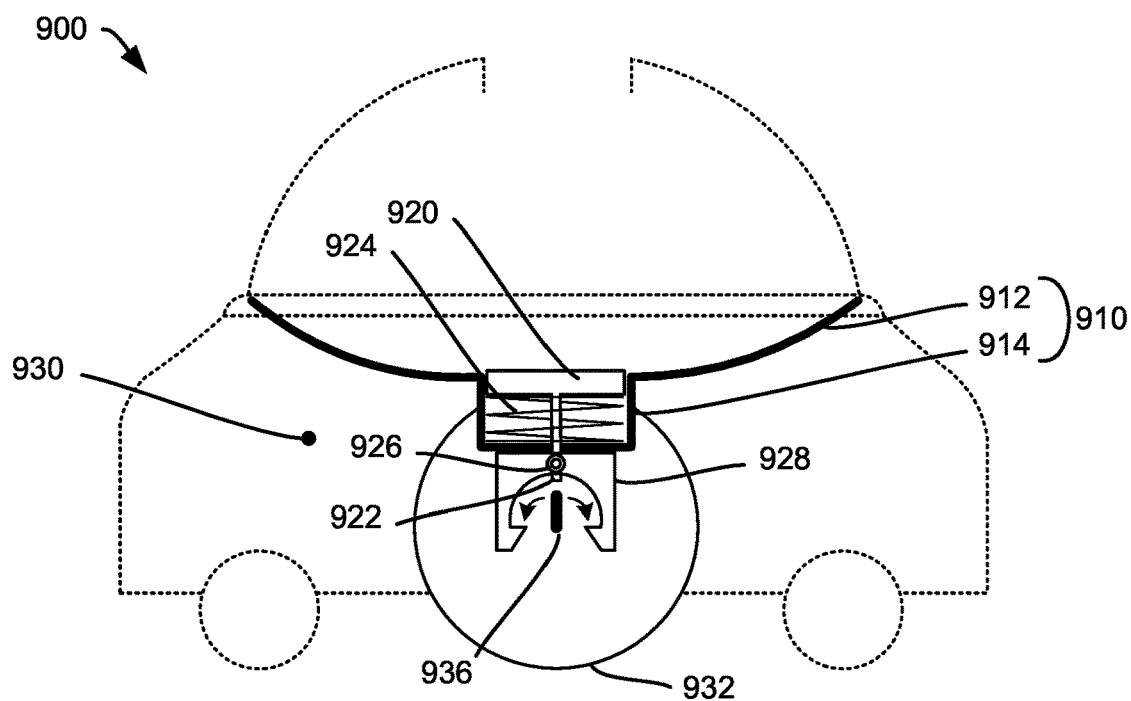
FIG. 9 is an illustrative side cut away view of a treat dispensing device in accordance with embodiments of the present invention.

FIG. 9 is an illustrative side cut away view of treat dispensing device 900 in accordance with embodiments of the present invention. In particular, FIG. 9 illustrates a dispensing mechanism embodiment housed within the base. As illustrated, treat dispensing device 900 includes bowl portion 910 which includes central recessed portion 914 and bottom surface 912 surrounding the central recessed portion and sloped toward the central recessed portion. In this manner, treats loaded into a treat dispensing device embodiment settle toward the dispensing mechanism. Treat dispensing device further includes compartment portion 930 positioned under bowl portion 910 for housing various elements of the device. As illustrated, the dispensing mechanism includes a plunger which includes plunger disk 920, plunger rod 922 and plunger stop 926. In embodiments, the plunger disk is slidingly engaged along the central recessed portion. Furthermore, in embodiments, the plunger disk is sized so that treats cannot be captured underneath the plunger disk or interfere with movement of the plunger disk along the central recessed portion. Further illustrated, dispensing mechanism further includes compression spring 924 positioned below plunger disk 920 and contained within central recessed portion 914. Further illustrated, dispensing mechanism includes pivoting escapement 928 that pivots along a pivot point 926 on plunger rod 922. As may be seen, in embodiments, the pivot point and the plunger stop are co-located. In operation, pivoting escapement 928 is actuated by crankshaft 936 rotating in a forward or a backward rotation in response to movement of drive wheel 932.

Figure 10:
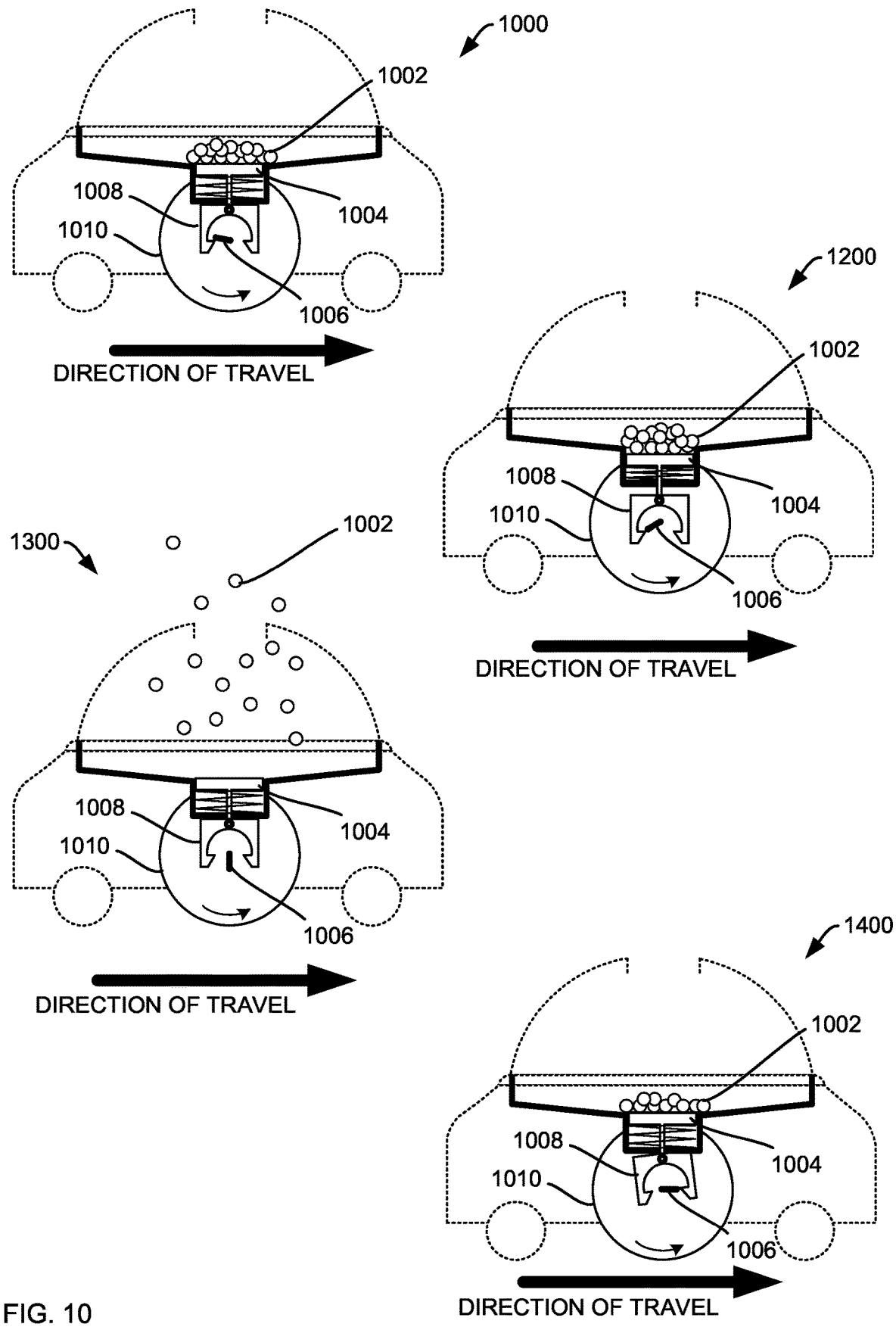
FIG. 10 is an illustrative representation of a method of dispensing treats with a treat dispensing device in accordance with embodiments of the present invention.

FIG. 10 is an illustrative representation of a method of dispensing treats with a treat dispensing device in accordance with embodiments of the present invention. In particular, FIG. 10 illustrates four device positions during operation namely resting position 1000, compressed position 1200, dispersing position 1300, and reset position 1400. Prior to the operation of treat dispensing device embodiments, the treat dispensing device may be loaded with provided treats either loading treats through any of the openings in the dome-shaped covering or by removing the dome-shaped covering, placing the provided treats in the bowl portion, and replacing the dome-shaped covering. Once treats have been loaded into a treat dispensing device, the device is in resting position 1000 as illustrated. When in resting position 1000, treats 1002 settle toward plunger 1004. At this point, drive wheel 1010 may be rotated corresponding with the direction of travel which rotates crankshaft 1006. As the device moves, crankshaft engages pivoting escapement 1008. As the device continues to move, the device enters compressed position 1200. At this point, crankshaft 1006 engages pivoting escapement 1008 by drawing the pivoting escapement downward, which lowers plunger 1004. As plunger is lowered, treats 1002 settle into the central recessed portion.

As the device moves further, the device enters dispersing position 1300. At this point, crankshaft 1006 disengages pivoting escapement 1008, which releases plunger 1004 with an audible "pop." The energy stored by the compression spring disperses treats 1002 through the one or more openings in the dome-shaped housing. The device continues to move forward and enters reset position 1400. At this point, crankshaft 1006 engages pivoting escapement 1008. As illustrated, pivoting escapement 1008 pivots to allow crankshaft 1006 to reset. As may be seen, the pivoting escapement is configured to operate in either rotation so the treat dispensing device may operate in either a forward or backward direction.

Figure 11:
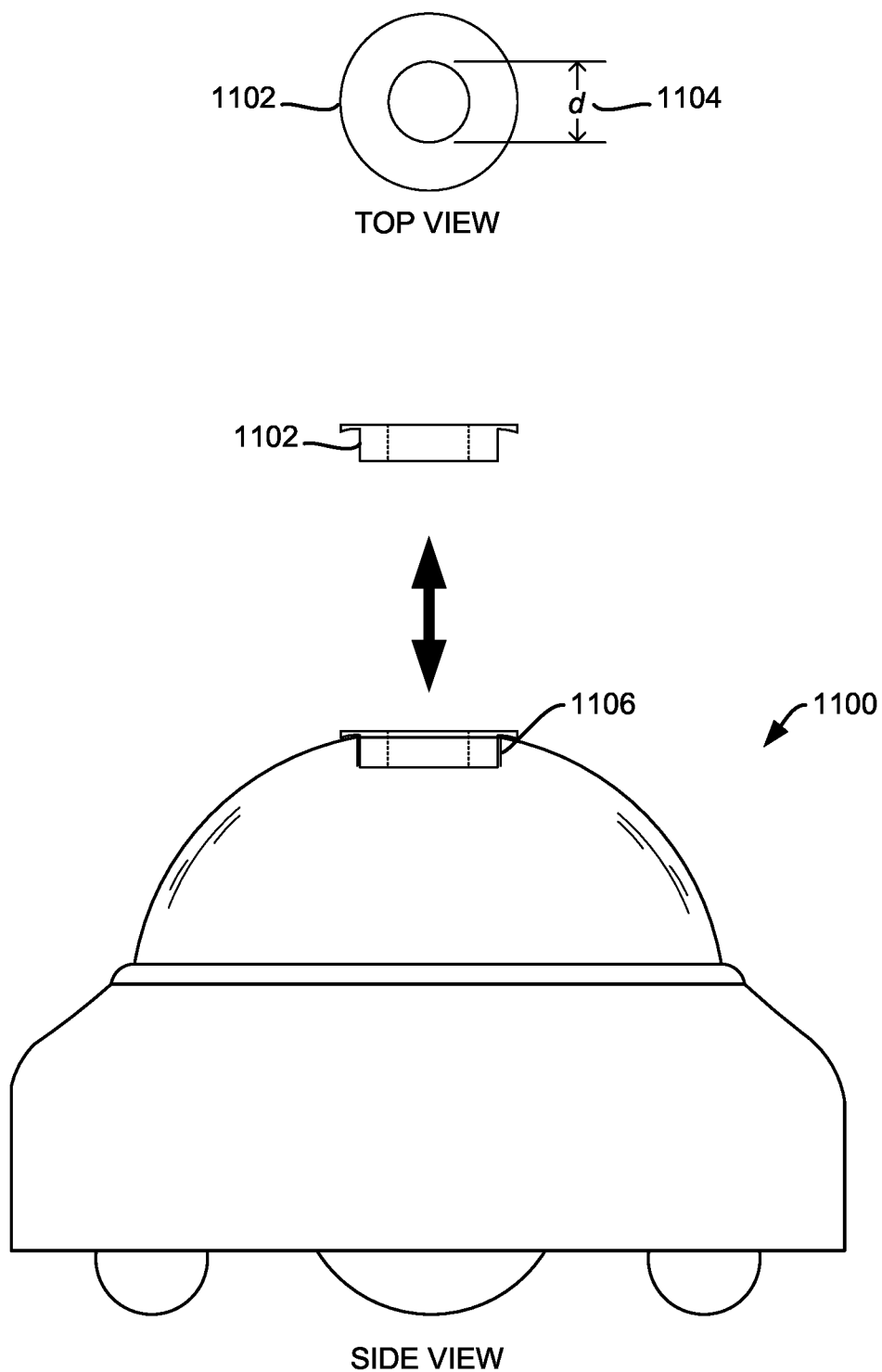
FIG. 11 is an illustrative representation of a treat dispensing device with insert in accordance with embodiments of the present invention.

FIG. 11 is an illustrative representation of treat dispensing device 1100 with insert 1102 in accordance with embodiments of the present invention. In some embodiments, it may be desirable to limit the size of treats dispensed or the number of treats dispensed. For example, a smaller animal may require smaller treats while a larger animal may require larger treats. In another example, the owner may wish to limit the number of treats dispensed due to dietary requirements of the animal. In these examples, an insert may be utilized to limit or close any of the openings in the dome-shaped covering. In the embodiment illustrated, limiting insert 1102 may be inserted into opening 1106 to limit the size and amount of treat dispensed. Limiting insert 1102 may have diameter (d) 1104 in accordance with a user's needs. In an embodiment, d=0 and the insert is a closing insert. In other embodiments, d>0 and the insert is a limiting insert. Any sized insert may be utilized without departing from embodiments provided herein.

Additional Embodiments

Figure 12:
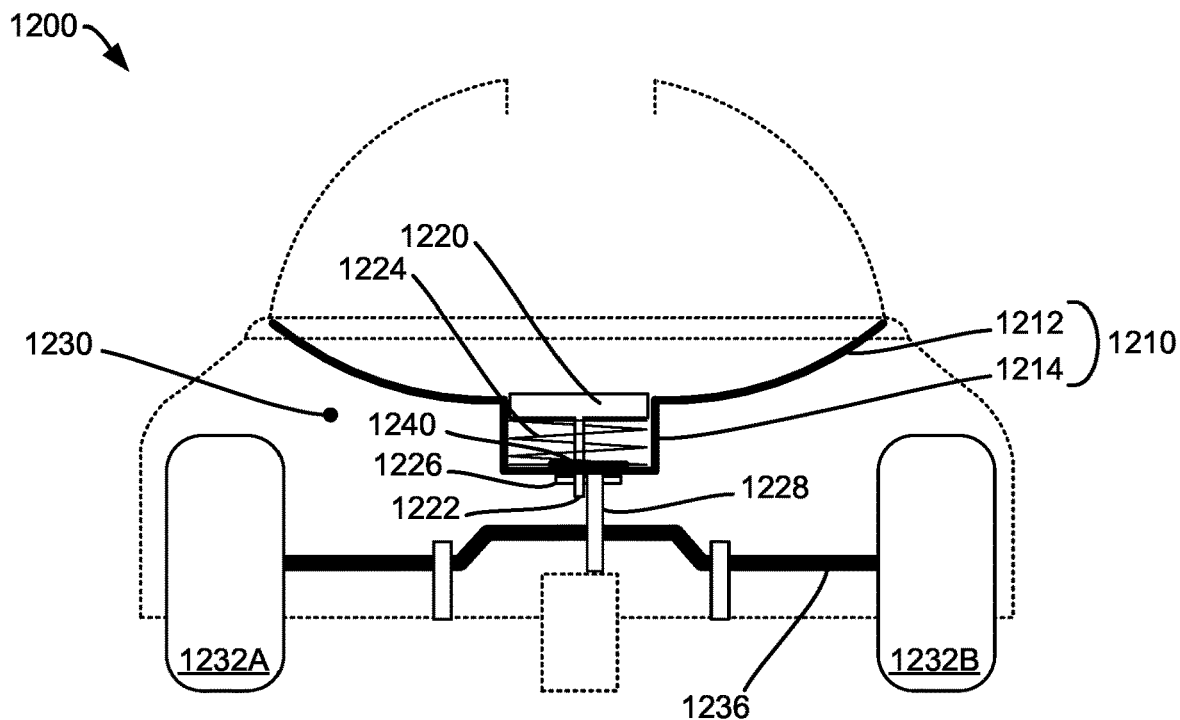
FIG. 12 is an illustrative front cut away view of a treat dispensing device in accordance with embodiments of the present invention.

FIG. 12 is an illustrative front cut away view of treat dispensing device 1200 in accordance with embodiments of the present invention. In particular, FIG. 12 illustrates a dispensing mechanism embodiment housed within the base. As illustrated, treat dispensing device 1200 includes bowl portion 1210 which includes central recessed portion 1214 and bottom surface 1212 surrounding the central recessed portion and sloped toward the central recessed portion. In this manner, treats loaded into a treat dispensing device embodiment settle toward the dispensing mechanism. Treat dispensing device further includes compartment portion 1230 positioned under bowl portion 1210 for housing various elements of the device. As illustrated, the dispensing mechanism includes a plunger which includes plunger disk 1220, plunger rod 1222 and plunger stop 1226. In embodiments, the plunger disk is slidingly engaged along the central recessed portion. Furthermore, in embodiments, the plunger disk is sized so that treats cannot be captured underneath the plunger disk or interfere with movement of the plunger disk along the central recessed portion. Further illustrated, dispensing mechanism further includes compression spring 1224 positioned below plunger disk 1220 and contained within central recessed portion 1214. Further illustrated, dispensing mechanism includes pivoting escapement 1228. In operation, pivoting escapement 1228 is actuated by crankshaft 1236 rotating in a forward or a backward rotation in response to movement of drive wheels 1232A and 1232B. Furthermore, when the pivoting escapement is actuated, the plunger is suddenly released to eject a treat. The sudden release of the plunger creates a "popping" noise as plunger stop 1226 strikes the bottom of central recessed portion 1214. In some embodiments, pad 1224 may be placed in a recess 1240 of the central recessed portion to soften the "popping" noise caused by the strike. In embodiments, pads may be manufactured from a polymeric or rubberized compound. This softening of the "popping" noise may be useful to reduce animal anxiety due to the startling effects of the noise.

Figure 13:
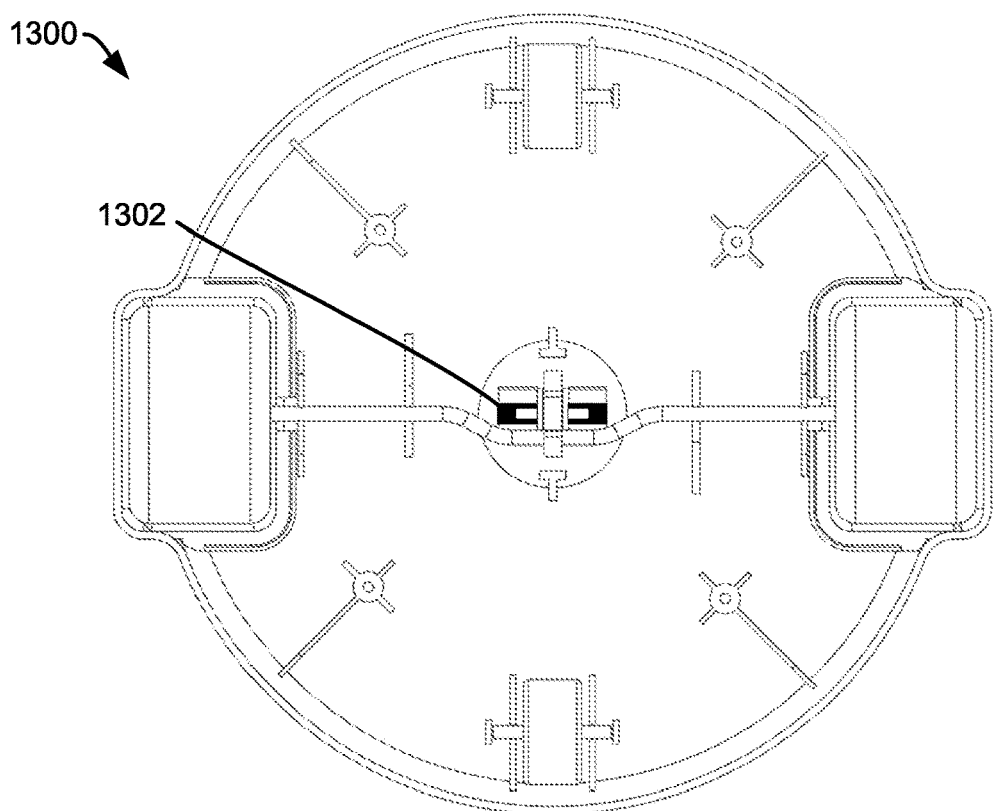
FIG. 13 is an illustrative bottom view of a treat dispensing device in accordance with embodiments of the present invention.

FIG. 13 is an illustrative bottom view of treat dispensing device 1300 in accordance with embodiments of the present invention. In particular, FIG. 13 illustrates pad 1302 placed in a recess of the central recessed portion. As noted above for FIG. 12, in some embodiments, pad 1302 may be placed in a recess of the central recessed portion to soften the "popping" noise caused by the strike. In embodiments, pads may be manufactured from a polymeric or rubberized compound. This softening of the "popping" noise may be useful to reduce animal anxiety due to the startling effects of the noise.

Figure 14:
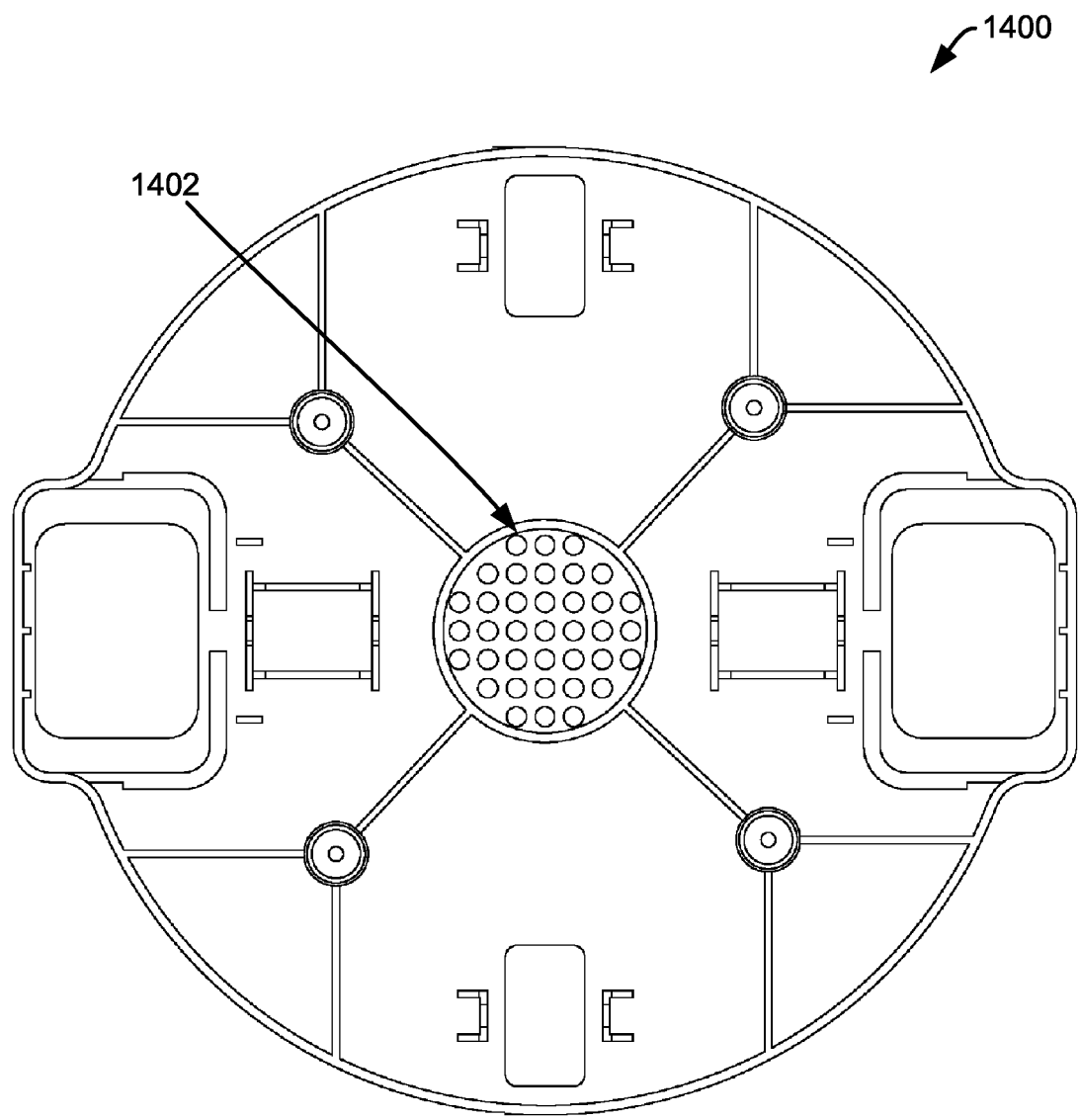
FIG. 14 is an illustrative bottom view of a treat dispensing device in accordance with embodiments of the present invention.

FIG. 14 is an illustrative bottom view of treat dispensing device 1400 in accordance with embodiments of the present invention. In particular, FIG. 14 illustrates vented cover 1402 positioned centrally along the bottom surface of treat dispensing device 1400 to cover the dispensing mechanism of the treat dispensing device. It may be appreciated that a vented cover may be useful to both inhibit the introduction of dirt and debris into the compartment as well as provide ventilation to avoid undue moisture in the compartment.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A treat dispensing device comprising:
   a base, wherein the base comprises a bowl portion and a central recessed portion, wherein the central recessed portion is positioned under the bowl portion;
   a dome-shaped covering removably coupled along a top edge of the bowl portion, wherein the dome-shaped covering comprises a dome surface having at least one opening along the dome surface;
   a pair of drive wheels connected by a crankshaft;
   a dispensing mechanism actuated by rotation of the crankshaft, wherein
   the dispensing mechanism includes:
   a plunger having a plunger disk, a plunger rod, and a plunger stop, wherein
   the plunger disk is slidingly engaged along the central recessed portion;
   a compression spring positioned below the plunger disk and contained within the central recessed portion; and
   a pivoting escapement actuated by the crankshaft rotating in a forward or a backward rotation of the crankshaft, wherein
   the pivoting escapement is pivotally coupled with the plunger rod by the plunger stop, wherein the plunger stop directly engages with a pad recessed along a bottom surface of the central recessed portion to limit upward vertical movement of the plunger, and wherein the pivoting escapement resets by directly engaging with the bottom surface of the central recessed portion; and a pair of stabilizing wheels.

2. The treat dispensing device of claim 1, further comprising:

a vented cover positioned centrally along a bottom surface of the treat dispensing device to cover the dispensing mechanism.

3. The treat dispensing device of claim 1, further comprising:

a reducing insert removably inserted into the at least one opening to reduce the at least one opening in size.

4. The treat dispensing device of claim 1, further comprising:

a closing insert removably inserted into the at least one opening to close the at least one opening.

5. The treat dispensing device of claim 1, wherein each of the pair of stabilizing wheels comprise a wheel rotatably coupled with a fixed axle.

6. The treat dispensing device of claim 1, wherein each of the pair of stabilizing wheels comprise a swivel castor.

7. The treat dispensing device of claim 1, wherein the treat dispensing device dispenses a plurality of treats in response to moving in either a forward or a backward direction.

\* \* \* \* \*